United States Patent [19]

Kemmel

[11] 4,283,666
[45] Aug. 11, 1981

[54] SPEED CONTROL DEVICE FOR A HOME SEWING MACHINE

[75] Inventor: Patrice J. Kemmel, Stutensee, Fed. Rep. of Germany

[73] Assignee: Pfaff Haushaltmaschinen GmbH, Fed. Rep. of Germany

[21] Appl. No.: 76,381

[22] Filed: Sep. 17, 1979

[30] Foreign Application Priority Data

Sep. 15, 1978 [DE] Fed. Rep. of Germany ....... 2840208

[51] Int. Cl.$^3$ .............................................. H05D 5/16
[52] U.S. Cl. .................................... 318/349; 318/311; 318/342; 318/348; 318/514
[58] Field of Search ....... 318/345 C, 345 CA, 345 D, 318/345 G, 345 H, 305, 342, 348, 349, 109, 442, 311, 315, 386, 514

[56] References Cited

U.S. PATENT DOCUMENTS

| 3,912,994 | 10/1975 | Stovall | 318/342 |
| 4,152,632 | 5/1979 | Peterson | 318/317 |

Primary Examiner—David Smith, Jr.
Attorney, Agent, or Firm—McGlew and Tuttle

[57] ABSTRACT

A speed control device for the motor of a home sewing machine, comprising, a comparator having one input connected to a reference voltage, an output connected to the motor and another input, a first control circuit with a variable resistor connected to the other input of the comparator and a second control circuit with a low motor speed constant resistor and a switch connected to the same other input of the comparator. A voltage sensor is provided between the first and second control circuits and the stated other input of the comparator so that the motor is operated at a low motor speed corresponding to the constant resistor of the second control circuit when the variable resistor of the first control circuit is in its higher resistance position and for switching the control of the motor to vary according to the variation of the variable resistor in the first control circuit when the resistance of the variable resistor in the first control circuit falls below that of the constant resistor and the second control circuit.

6 Claims, 1 Drawing Figure

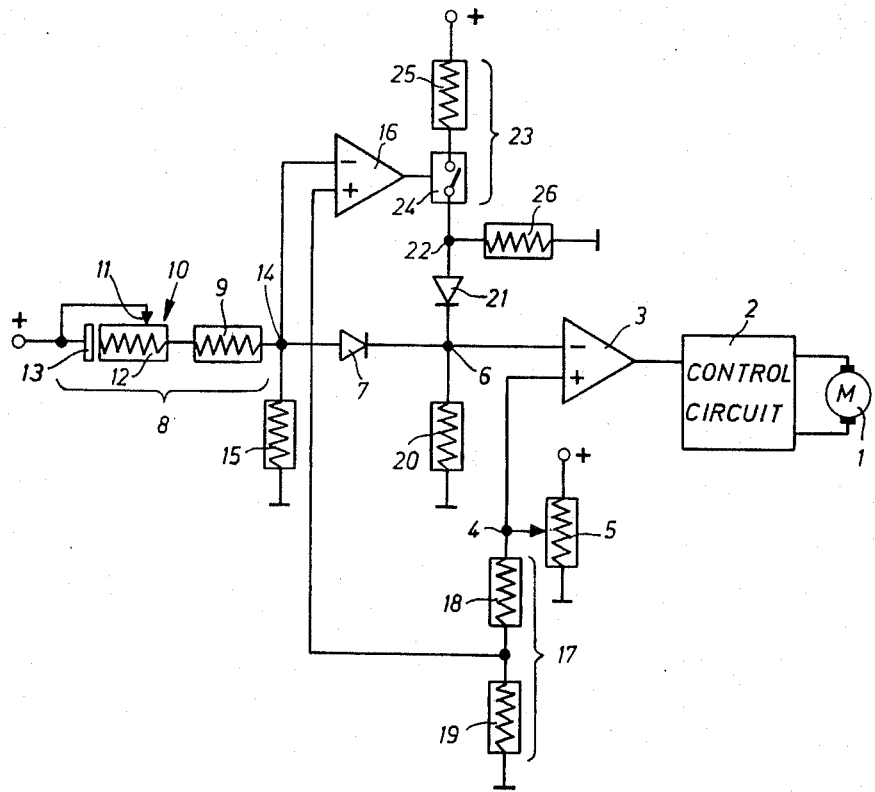

SPEED CONTROL DEVICE FOR A HOME SEWING MACHINE

FIELD AND BACKGROUND OF THE INVENTION

This invention relates to sewing machine controls in general and, in particular, to a new and useful speed control device for the motor of a home sewing machine.

The hitherto known devices of this kind have the disadvantage that the resultant sewing machine control is imperfect in the lower speed range. It is precisely in the lower speed range, however, that a great torque must be available to assure a large needle piercing power at a low number of sewing machine stitches.

A home sewing machine is known from U.S. Pat. No. 3,503,352, which has a motor with two circuits, the first circuit being intended for normal driving with variable speed and the second for driving at a reduced speed. The second circuit becomes effective when the variable resistor of the first circuit, built into the foot starter, is turned off completely by setting back the starter rocker. It serves the purpose of stopping the sewing machine in a predetermined needle position, usually the high needle position. To accomplish this, the second circuit is turned off in a predetermined position.

The known arrangement has the disadvantage that the operator, particularly at the end of a sewing operation with the machine already stopped, can still keep the variable resistor operative by operating the starter rocker slightly. Since, in its uppermost setting range, the resistor's resistance usually exceeds the amount of resistance required to start the motor, which amount is determined by the frictional drag occurring in the machine or, while sewing, the sewing machine usually does not start in this setting range.

If the operator then turns off the variable resistor by setting the starter rocker back completely, either accidentally or intentionally, the second control circuit is turned on, and the machine is brought into the predetermined stopping position. This places the operator in great danger, particularly if this happens during a manipulation of materials on the sewing machine.

SUMMARY OF THE INVENTION

The present invention has as one of its objects to avoid these disadvantages and to create a simple control device for changing the speed of a sewing machine.

It is another object of the invention to create a circuit for a speed control device of a sewing machine motor which, upon the actuation of the variable resistor, connects one control circuit to the motor in the range below a predetermined speed and another control circuit to the motor in the range above a predetermined speed.

According to the invention, this problem is solved by a circuit effecting the switching at a speed which is predetermined by a constant resistor, and by a voltage sensor connected to the first control circuit and actuating a switch in the second control circuit. The voltage sensor is expediently designed as a threshold value switch.

One particularly favorable and advantageous solution results in a speed control device in which the control circuit is connected to one input of a comparator to whose other input a reference voltage is applied, when the two control circuits, preceded by a diode each, are connected jointly to the one comparator input. The diode prevents the two control circuits from influencing each other.

A Schmitt trigger for effecting the closing of the switch located in the second control circuit when a predetermined maximum resistance of the variable resistor is fallen below, may be connected to the first control circuit in a simple manner.

One exceedingly favorable solution, in which the switch in the second control circuit is turned on as early as immediately after the actuation of the variable resistor, results from connecting, between the diode and the resistor in the first control circuit, one input of another comparator whose other input is connected to a reference voltage via a voltage divider and whose output switches the switch in the second control circuit.

Accordingly, another object of the present invention is to provide a speed control device for the motor of a sewing machine and particularly a home sewing machine, comprising, a first comparator having an input connected to a reference voltage and an output connected to the motor with another input, a first control circuit with a variable resistor connected to the other input of the first comparator, a second control circuit with a low motor speed constant resistor and a switch connected to the other input of the first comparator, voltage sensing means connected between the first and second control circuits and the other input of the comparator for controlling the motor at a low motor speed corresponding to the constant resistor when the variable resistor is at a value above that of the constant resistor and for controlling the motor speed according to the variations of the variable resistor when the resistance thereof falls below that of the constant resistor.

A further object of the invention is to provide a speed control device for the motor of a home sewing machine which is simple to design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

The only FIGURE of the drawing is a wiring diagram of an embodiment of the speed control device according to the invention.

DESCRIPTION OF THE PREFERRED EMBODIMENT

The speed of a motor 1 shown in the drawing is controlled in a manner known per se by a control circuit 2. The control circuit 2 may be of any design. For example, it may contain a triac, inserted in the circuit of the electric motor 1 which is forwardly controlled by the gating control principle.

The control signal is formed by a comparator 3 to whose one input is applied, from a connecting point 4, the take-off of a potentiometer 5 located between the plus and minus poles of a power source. A first control circuit 8 is connected to the other input of the comparator 3, through a connecting point 6 and a diode 7. First control circuit 8 consists of a series connection of a resistor 9 and a variable resistor 10 with an end shutoff and is connected to the plus pole of the power source. The resistor 9 may either be constant or variable as a potentiometer. The resistor 10 has a slider 11 which can be moved from a resistance element 12 to a shutoff segment 13 breaking the circuit 8. A resistor 15 is connected to a connecting point 14 located between the diode 7 and the resistor 9. Resistor 15 is connected to the minus pole of the power source. Also connected to the connecting point 14 is one input of a second comparator 16 whose other input is connected to a voltage divider 17 located between the connecting point 4 and the minus pole and consisting of the resistors 18 and 19.

The connecting point 6 is connected to the minus pole and via a diode 21, a connecting point 22 and a second control circuit 23 to the plus pole through a leak resistor 20. The control circuit 23 consists of an analog switch 24 which is closed when a voltage limit is fallen below, and of a constant resistor 25. The connecting point 22 is wired to the minus pole through a resistor 26. The comparator 16 effects the switching of the analog switch 24 in a manner known per se.

The circuit operates as follows:

In the initial state, the slider 11 of the resistor 10 rests on the shutoff segment 13 so that the control circuit 8 is broken. Since the control circuit 23 is also broken by the open switch 24, no voltage is applied to the negative input of the comparator 3 so that the control circuit 2 sends no control signal to the motor 1 which, consequently, is standing still.

Upon the actuation of the resistor 10, current flows through the resistor 15 and through the diode 7 and the resistor 20 according to the voltage drop in the resistors 9 and 10. Therefore, a voltage builds up at the negative inputs of the comparators 3 and 16. In the high resistance range of the total resistance from the resistors 9 and 10, the voltage applied to the comparator 3 by the control circuit 8 falls below the reference voltage applied to the positive input by the resistor 5 so that the comparator 3 gives no control signal to the control circuit 2.

On the other hand, the voltage furnished by the control circuit 8 is compared by the comparator 16 with a part value of the reference voltage set at the resistor 5 and tapped via the voltage divider 17 which act as a reference voltage resistor means. The reference part voltage can be selected low enough so that the comparator 16 responds immediately upon moving the slider 11 of resistor 10 from the shutoff segment 13 to the high resistance portion of the resistance element 12. As soon as the voltage of the control circuit 8 applied to the comparator 16 exceeds the reference part voltage applied, the output of comparator 16 switches to zero, thus closing the switch 24 so that a current precisely determined by the value of the resistor 25 flows via the resistor 25 and the switch 24 through the resistor 26. Resistor 25 thus acts as a base speed resistor means.

A voltage potential, fed via the diode 21 to the connecting point 6 and hence to the negative terminal of the comparator 3, forms at the connecting point 22. The voltage potential is compared by the comparator 3 with the reference voltage set at the resistor 5 and applied to the comparator's positive input. Via the control circuit 2, the comparator 3 now controls a minimum speed of motor 1 which is predetermined by the resistor 25.

The control voltage at the connecting point 6 then has a potential more positive than the voltage at the connecting point 14 so that the diode 7 blocks. Therefore, the control circuit 8 has no influence on the speed of motor 1. The constant, low or base speed of motor 1 is maintained as long as the total resistance from resistor 9 and resistor 10 in the control circuit 8 is greater than that of resistor 25 in the control circuit 23. As soon as the total resistance of the two resistors 9 and 10 falls below that of resistor 25, it effects a greater voltage drop at the resistor 15 than does the resistor 25 at the resistor 26. Therefore, the voltage potential forming at the connecting point 14 and fed via the diode 7 to the connecting point 6 also, exceeds the voltage potential at the connecting point 22 of the control circuit 23 which the diode 21 now blocks.

As the slider 11 is moved further into the low resistance range of the resistor 10, the latter takes over the influencing of the comparator 3. The comparator 3 then controls the speed of motor 1 through the control circuit 2 in accordance with the position of slider 11.

When slider 11 is moved back over the resistor 10, the motor control remains intact through changing the resistance 20 until the total of its resistance and that of resistor 9 exceeds the resistance of resistor 25. Then it is only the voltage drop of the control circuit 23 at the resistor 26 which is still effective for the comparator 3 which keeps the motor 1 at the predetermined minimum speed until the resistance in the control circuit 8 becomes so high that the voltage at the negative input of comparator 16 falls below the reference part voltage and the comparator 16 opens the switch 24. This practically occurs only when the slider 11 of resistor 10 runs onto the latter's shutoff segment 13.

The resistor 9 determines the maximum speed of motor 1. It may also be designed as a potentiometer so that the maximum speed of motor 1 is variable within certain limits. A Schmitt trigger which closes the switch 24 when its threshold is exceeded may also be used in place of the comparator 16.

While a specific embodiment of the invention has been shown and described in detail to illustrate the application of the principles of the invention, it will be understood that the invention may be embodied otherwise without departing from such principles.

What is claimed is:

1. A speed control device for the motor of a sewing machine, comprising, a first control circuit having a variable resistor connected to the motor, a second control circuit having a constant resistor connected to the motor, selector switching means operatively connecting said first and second control circuits to the motor alternatively when said motor reaches a given speed, switch means in said second control circuit, and voltage sensor means connected to said first control circuit and to said switching means of said second control circuit for actuating said switch means when said variable resistor reaches a given value.

2. A speed control device, as claimed in claim 1, wherein said voltage sensor comprises a threshold voltage switch.

3. A speed control device for the motor of a sewing machine, as claimed in claim 1, further comprising a comparator having an output connected to the motor, one input connected to said first and second control circuits, and another input connected to a reference voltage, and wherein said selector switching means comprises diodes, each of said first and second control circuits including one of said diodes connected thereto and to said one input of said comparator.

4. A speed control device for the motor of a sewing machine, as claimed in claim 3, wherein said voltage sensor means comprises a Schmitt trigger connected to said switch means in said second control circuit for effecting a closing of said switch means when said variable resistor reaches a predetermined maximum resistance.

5. A speed control device for the motor of a sewing machine, as claimed in claim 3, further comprising a second comparator having one input connected to said first control circuit and another input connected to a reference voltage and an input connected to said switch means in said second control circuit.

6. A speed control device for the motor of a sewing machine, comprising, a first comparator having one input connected to a reference voltage, an output connected to the motor and another input, a first control circuit having a variable resistor connected to said other input of said first comparator, a second control circuit with a low motor speed constant resistor and switch means connected to said other input of said first comparator, voltage sensing means connected between said first control circuit and said switch means for closing said switch means when said variable resistor reaches a maximum value to control the motor to operate at a selected low motor speed corresponding to said constant resistor, and selector switching means comprising a diode connected between said first and second control circuits and said first comparator for switching the control of the motor from said low selected speed to a speed corresponding to the variations of said variable resistor and said first control circuit when the resistance of said variable resistor falls below that of said constant resistor.

* * * * *